United States Patent
Inatomi et al.

(10) Patent No.: US 9,093,182 B2
(45) Date of Patent: Jul. 28, 2015

(54) FAST REACTOR

(75) Inventors: Takanari Inatomi, Kawasaki (JP);
Ayano Ebihara, Yokohama (JP);
Hiroshi Nakamura, Hadano (JP); Hideo Kobayashi, Kawasaki (JP); Katsushi Hasegawa, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 848 days.

(21) Appl. No.: 13/266,489

(22) PCT Filed: Apr. 27, 2010

(86) PCT No.: PCT/JP2010/057429
§ 371 (c)(1),
(2), (4) Date: Jan. 11, 2012

(87) PCT Pub. No.: WO2010/126028
PCT Pub. Date: Nov. 4, 2010

(65) Prior Publication Data
US 2012/0099694 A1  Apr. 26, 2012

(30) Foreign Application Priority Data
Apr. 27, 2009 (JP) .................. 2009-107950

(51) Int. Cl.
*G21C 15/00* (2006.01)
*G21C 1/32* (2006.01)
(Continued)

(52) U.S. Cl.
CPC *G21C 1/322* (2013.01); *G21C 1/02* (2013.01); *G21C 15/02* (2013.01); *G21C 15/247* (2013.01); *G21C 11/022* (2013.01); *Y02E 30/34* (2013.01)

(58) Field of Classification Search
CPC .......... G21C 1/32; G21C 1/322; G21C 1/326; G21C 1/328
USPC .................. 376/347, 361, 402, 406
See application file for complete search history.

(56) References Cited

U.S. PATENT DOCUMENTS 1,333,346 A * 3/1920 Schmidt ................. 417/163
5,265,136 A   11/1993 Yamazaki et al.
(Continued)

FOREIGN PATENT DOCUMENTS

EP  0 308 691 A1  3/1989
EP  1 489 624 A2  12/2004
(Continued)

OTHER PUBLICATIONS

International Preliminary Report on Patentability (IPRP) dated Dec. 1, 2011 (in English) in counterpart International Application No. PCT/JP2010/057429.
(Continued)

Primary Examiner — Jack W Keith
Assistant Examiner — Marshall O'Connor
(74) Attorney, Agent, or Firm — Holtz, Holtz, Goodman & Chick PC

(57) ABSTRACT

A fast reactor 1 includes: a reactor vessel 7 accommodating therein a core 2 and a primary coolant 21; a core support 13 supporting the core 2 from below; and a bulkhead 6 disposed on the core support 13, the bulkhead 6 extending upward and surrounding the core 2 from a lateral side. Between an inner surface of the reactor vessel 7 and the bulkhead 6, there is disposed an intermediate heat exchanger 15 configured to cool the primary coolant 21, and an electromagnetic pump 14 configured to pressurize the cooled primary coolant 21. A neutron shield 8 supported by an upper supporting plate 29 from above is disposed below the electromagnetic pump 14. The upper supporting plate 29 has an opening 29*a*. Between an outlet 14*b* of the electromagnetic pump 14 and the upper supporting plate 29, there is disposed a coolant guide mechanism 17 configured to guide the pressurized primary coolant 21 from the electromagnetic pump 14 to the neutron shield 8 through the opening 29*a* of the upper supporting plate 29.

8 Claims, 14 Drawing Sheets

(51) Int. Cl.
*G21C 1/02* (2006.01)
*G21C 15/02* (2006.01)
*G21C 15/247* (2006.01)
*G21C 11/02* (2006.01)

(56) References Cited

U.S. PATENT DOCUMENTS

| | | | |
|---|---|---|---|
| 5,420,897 | A | 5/1995 | Kasai et al. |
| 2002/0075983 | A1 | 6/2002 | Nishiguchi et al. |
| 2006/0126775 | A1 | 6/2006 | Nishiguchi |
| 2009/0080586 | A1* | 3/2009 | Yokoyama et al. ............ 376/221 |

FOREIGN PATENT DOCUMENTS

| | | | | |
|---|---|---|---|---|
| JP | 03-122593 | A | | 5/1991 |
| JP | 06-174882 | A | | 6/1994 |
| JP | 2000-180572 | A | | 6/2000 |
| JP | 2001-188093 | A | | 7/2001 |
| JP | 2001188093 | A | * | 7/2001 .............. G21C 1/02 |

OTHER PUBLICATIONS

Chinese Office Action dated Aug. 30, 2013 (and English translation thereof) in counterpart Chinese Application No. 201080018317.8.

International Search Report dated Jun. 15, 2010 issued in International Appln. No. PCT/JP2010/057429.

Canadian Office Action dated Jul. 18, 2013 (in English) issued in counterpart Canadian Application No. 2,759,865.

V. Kuznetsov, "Status of Small Reactor Designs Without On-Site Refuelling", IAEA-TECDOC-1536, ISBN 92-0-115606-5, Jan. 2007.

Chang Y. et al.: "Small Modular Fast Reactor Design Description", Argonne National Laboratory (ANL) and Japan Nuclear Cycle Development Institute (JNC), Jul. 1, 2005.

Canadian Office Action dated May 28, 2014 in counterpart Canadian Application No. 2,759,865.

Extended European Search Report (EESR) dated Nov. 15, 2013 (in English) issued in counterpart European Application No. 10769726.0.

* cited by examiner

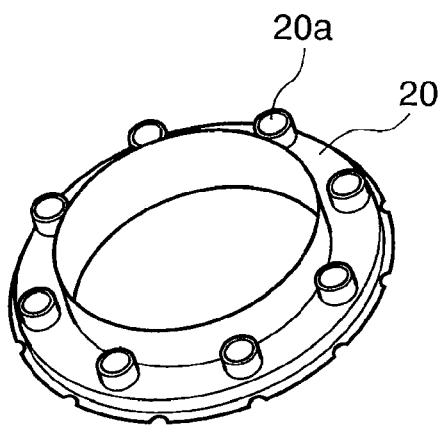
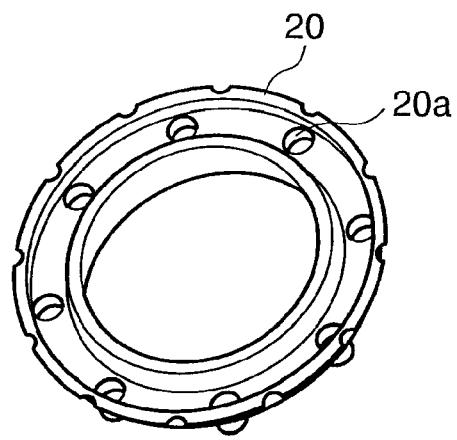
FIG. 5A          FIG. 5B
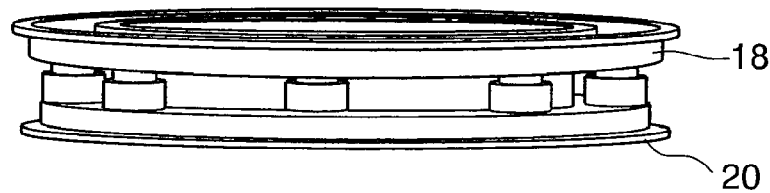
FIG. 6A
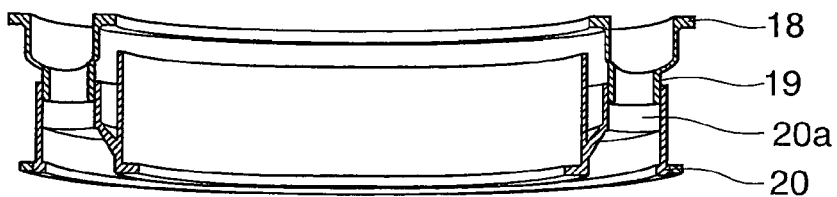
FIG. 6B

FAST REACTOR

This application is a U.S. National Phase Application under 35 USC 371 of International Application PCT/JP2010/057429 filed Apr. 27, 2010.

FIELD

The present invention relates to a fast reactor, in particular, a fast reactor having a high coolant sealing property and an excellent maintainability.

BACKGROUND

In a fast reactor, an effort for reducing a leakage amount of coolant from a sealing part has been conventionally exerted. The below Patent Document 1 shows an example of a conventional fast reactor, which is shown in FIG. 15.

As shown in FIG. 15, the fast reactor 1 described in Patent Document 1 includes a core 2 formed of a nuclear fuel assembly. The core 2 has a substantially cylindrical shape as a whole. An outer circumference of the core 2 is surrounded by a core barrel 3. A reflector 4 surrounding the core barrel 3 is located outside the core barrel 3. Outside the reflector 4, there is disposed a bulkhead 6 that surrounds the reflector 4 and constitutes an inner wall of a flow path through which a primary coolant 21 (coolant) flows. A reactor vessel 7 constituting an outer wall of the flow path of the primary coolant 21 is located outside the bulkhead 6, with a predetermined clearance therebetween. A neutron shield 8 is disposed in the flow path of the primary coolant 21 such that the neutron shield 8 surrounds the core 2. The core 2, the core barrel 3, the bulkhead 6 and the neutron shield 8 are respectively supported by a core support 13 from below.

In FIG. 15, after the primary coolant 21 is pressurized by an electromagnetic pump 14, the primary coolant 21 passes through the neutron shield 8 and the core supports 13 and then reaches the core 2, whereby the cored 2 is cooled. The primary coolant 21 heated by the core 2 while passing therethrough is sent to an intermediate heat exchanger 15. In the intermediate heat exchanger 15, the heat is exchanged between the primary coolant 21 and a secondary coolant 31. In order to facilitate a maintenance operation, the intermediate heat exchanger 15 is configured to be drawn from the reactor vessel 7. In this case, a seal bellows attached to the intermediate heat exchanger is seated on a bellows seat fixed on the bulkhead 6. The seal bellows is compressed by a weight of the intermediate heat exchanger 15. Thus, the pressurized primary coolant 21 from an outlet of the electromagnetic pump 14 can be sealed against the heated primary coolant 21 inside the bulkhead 6.

Patent Document 1: JP5-119175A

SUMMARY OF THE INVENTION

In the fast reactor 1 described in Patent Document 1, when sodium is used as the primary coolant 21, it is considered that a temperature of the primary coolant 21 in a zone (higher temperature zone) from an outlet of the core 2 to an inlet of the intermediate heat exchanger 15 is about 500° C., and that a temperature of the primary coolant 21 in a zone (lower temperature zone) from an outlet of the intermediate heat exchanger 15 to an inlet of the core 2 is about 350° C. Namely, the structural member supporting the core 2 is used under such conditions as a high temperature and a large temperature difference. In particular, since the bulkhead 6 constituting the inner wall of the flow path of the primary coolant 21 also experiences a large pressure difference between the higher temperature zone and the lower temperature zone, in addition to the above temperature difference, the bulkhead 6 is exposed to an extremely severe environment.

In order to prevent that the primary coolant 21 in the higher temperature zone leaks into the lower temperature zone over the bulkhead 6 and that the primary coolant 21 in the lower temperature zone leaks into the higher temperature zone over the bulkhead 6, there have been heretofore proposed various seal structures 40 and 41 which use a seal bellows and a labyrinth seal, as in the fast reactor 1 described in Patent Document 1. However, as described above, these seal structures 40 and 41 are subjected to a large temperature difference and a large pressure difference. In addition, a sealing quality is influenced by a manufacturing tolerance such as a surface roughness and a flatness of a sealing surface, and an installation tolerance such as a parallelism and a concentricity. Thus, it is difficult to provide a sealing structure having a sufficient sealing property.

When a sealing function of the bulkhead 6 is insufficient, there is a possibility that the pressurized primary coolant 21 of a lower temperature from the outlet of the electromagnetic pump 14 might flow into the primary coolant 21 in the higher temperature zone at the outlet of the core 2. In this case, a temperature difference between the inlet and the outlet of the intermediate heat exchanger 15 is possibly decreased, resulting in deterioration of the heat exchanging function. Thus, a heat balance of the fast reactor 1 may be lost, which induces a large impact on an output of a plant. In addition, since a flow amount of the primary coolant 21 for cooling the core 2 is lost, there is a possibility that a temperature of the core 2 might increase, whereby a safety of the fast reactor 1 is lowered.

In addition, in the conventional fast reactor 1, the intermediate heat exchanger 15 and the electromagnetic pump 14 are arranged in series with each other. Thus, if the electromagnetic pump 14 having a higher failure probability is damaged, the electromagnetic pump 14 and the intermediate heat exchanger 15 should be simultaneously pulled out. In this case, since these equipments are radioactivated, it is necessary to exchange both of the equipments. Further, since a huge cask for storing these equipments or for bringing these equipments to a disposal place is needed, an enormous cost is required.

The present invention has been made in view of the above circumstances. The object of the present invention is to provide a fast reactor having a high primary coolant sealing property and an excellent maintainability.

According to the present invention, a fast reactor comprises:

a reactor vessel accommodating therein a core and a coolant;

a core supporting mechanism disposed in the reactor, the core supporting mechanism extending horizontally so as to support the core;

a bulkhead extending in parallel with the core and surrounding the core from a lateral side;

an intermediate heat exchanger disposed between an inner surface of the reactor vessel and the bulkhead, the intermediate heat exchanger being configured to cool the coolant that has been heated by the core;

a pump for coolant disposed between the inner surface of the reactor vessel and the bulkhead, the pump for coolant being configured to pressurize the coolant that has passed through the intermediate heat exchanger so as to be cooled; and a lower plenum structured below the core supporting mechanism, the lower plenum being configured to guide the coolant which has been pressurized by the pump for coolant to the core;

wherein:

the core supporting mechanism is provided with an opening through which the pressurized coolant from the pump for coolant passes; and disposed between an outlet of the pump for coolant and the core supporting mechanism is a coolant guide mechanism configured to guide the pressurized coolant from the pump for coolant to the lower plenum through the opening of the core supporting mechanism.

The fast reactor according to the present invention may further comprise a neutron shield located below the pump for coolant, wherein the core supporting mechanism is formed of an upper supporting plate disposed between the pump for coolant and the neutron shield so as to support the neutron shield, the upper support plate having an opening to which the coolant guide mechanism is connected.

In this case, the coolant guide mechanism may include an upper header mounted on the outlet of the pump for coolant, and a lower header disposed below the upper header and mounted on the upper supporting plate, the upper header may be provided with a downwardly projecting nozzle through which the pressurized coolant from the pump for coolant passes, and the lower header may be provided with a nozzle receiver slidably engaged with the nozzle of the upper header.

Alternatively, the coolant guide mechanism may include an annular upper header mounted on the outlet of the pump for coolant, and an annular lower header disposed below the upper header and mounted on the upper supporting plate, the upper header may include an annular inner wall extending downwardly from the outlet of the pump for coolant and an annular outer wall extending downwardly from the outlet of the pump for coolant, and the lower header may include an annular receiving part slidably engaged with the inner wall of the upper header and the outer wall of the upper header.

In the fast reactor according to the present invention, the core supporting mechanism may be formed of a core support supporting the core from below and having an opening to which the coolant guide mechanism is connected.

In this case, the coolant guide mechanism may include an upper header mounted on the outlet of the pump for coolant, and a lower header disposed below the upper header and mounted on the core support, and the upper header may be provided with a downwardly projecting nozzle through which the pressurized coolant from the pump for coolant passes, and the lower header may be provided with a nozzle receiver slidably engaged with the nozzle of the upper header.

Alternatively, the coolant guide mechanism may include an annular upper header mounted on the outlet of the pump for coolant, and an annular lower header disposed below the upper header and mounted on the core support, the upper header may include an annular inner wall extending downwardly from the outlet of the pump for coolant and an annular outer wall extending downwardly from the outlet of the pump for coolant, and the lower header may include an annular receiving part slidably engaged with the inner wall of the upper header and the outer wall of the upper header.

The fast reactor according to the present invention may further comprise:

a neutron shield located below the pump for coolant; and an upper supporting plate disposed between the pump for coolant and the neutron shield so as to support the neutron shield;

wherein:

the coolant guide mechanism includes an upper header mounted on the outlet of the pump for coolant, and a pipe passing through the upper supporting plate with one end of the pipe being engaged with the upper header and the other end thereof being connected to the core support;

the upper header is provided with a downwardly projecting nozzle through which the pressurized coolant from the pump for coolant passes; and the one end of the pipe is slidably engaged with the nozzle of the upper header.

In the fast reactor according to the present invention, the nozzle may be connected to the upper header through a spherical seating seal.

In the fast reactor according to the present invention, the upper header may be provided with a plurality of nozzles, and at least one of the nozzles is longer than the other nozzle(s).

In the fast reactor according to the present invention, when seen from above, the pump for coolant may be arranged on a position nearer to the core than the intermediate heat exchanger, such that the pump for coolant and the intermediate heat exchanger do not overlap with each other.

In the fast reactor according to the present invention, a part of the bulkhead, which is located above the upper supporting plate, may be formed of a manometerseal.

According to the present invention, in the fast reactor comprising the reactor vessel accommodating therein the core and the coolant, the pump for coolant, which is configured to pressurize the coolant that has passed through an intermediate heat exchanger so as to be cooled, is disposed between the inner surface of the reactor vessel and the bulkhead, and the neutron shield is disposed below the pump for coolant. In addition, the upper supporting plate supporting the neutron shield is disposed between the pump for coolant and the neutron shield. The upper supporting plate has the opening through which the pressurized coolant from the pump for coolant passes. Disposed between the outlet of the pump for coolant and the upper supporting plate is the coolant guide mechanism configured to guide the pressurized coolant from the pump for coolant toward the neutron shield through the opening of the upper supporting plate. Thus, the coolant of a lower temperature, which has been cooled by the intermediate heat exchanger and pressurized by the pump for coolant, can be guided by the coolant guide mechanism toward the neutron shield through the opening of the upper supporting plate. Therefore, there is no possibility that the coolant of a lower temperature, which has been pressurized by the pump for coolant, leaks to the coolant of a higher temperature, which has been heated by the core, through the bulkhead, whereby it is possible to improve a sealing property between the coolant of a lower temperature, which has been pressurized by the pump for coolant, and the coolant of a higher temperature, which has been heated by the core. As a result, lowering of a power generation efficiency of the fast reactor can be prevented, as well as reliability of the fast reactor can be enhanced.

BRIEF DESCRIPTION OF THE DRAWINGS

FIG. 4(*b*) is a view showing the upper header when seen from below in the first embodiment of the present invention.

FIG. 4(*c*) is a view showing a nozzle of the upper header in enlargement.

FIG. 5(*a*) is a view showing a lower header when seen from above in the first embodiment of the present invention.

FIG. 5(*b*) is a view showing the lower header when seen from below in the first embodiment of the present invention.

FIG. 6(*a*) is a view showing that the upper header and the lower header are connected to each other in the first embodiment of the present invention.

FIG. 6(*b*) is a sectional view showing that the upper header and the lower header are connected to each other in the first embodiment of the present invention.

DETAILED DESCRIPTION

First Embodiment

A first embodiment of the present invention will be described herebelow with reference to the drawings.

FIG. 1 to 6 are views showing a fast reactor in the first embodiment of the present invention.

At first, a fast reactor 1 in this embodiment is generally described with reference to FIG. 1.

Figure 1:
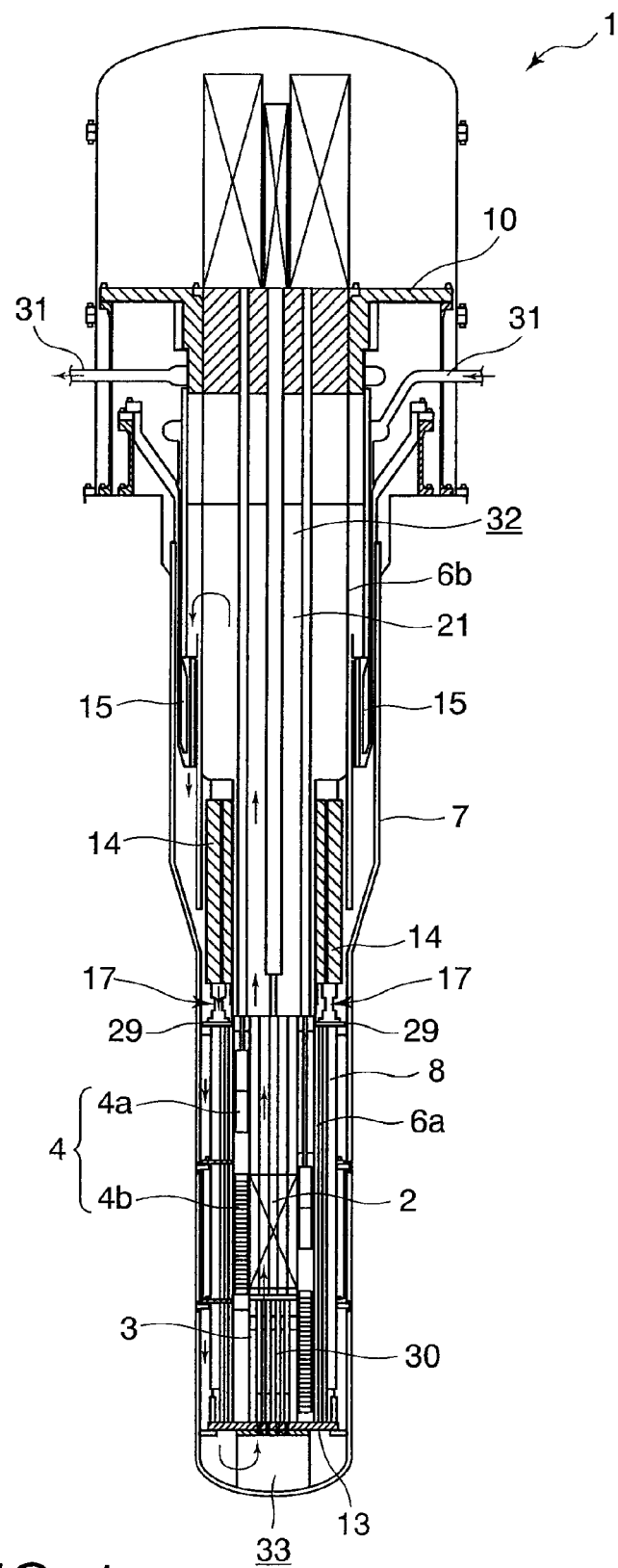
FIG. 1 is a view showing a fast reactor in a first embodiment of the present invention.

As shown in FIG. 1, the fast reactor 1 includes: a reactor vessel 7 accommodating there in a core 2 formed of a nuclear fuel assembly containing plutonium, and a primary coolant (coolant) 21 formed of liquid sodium; a core support 13 disposed in the reactor vessel 7 so as to support the core 2 from below; a core barrel 3 disposed on the core support 13 so as to surround the core 2 from a lateral side; a reflector 4 disposed so as to surround the core barrel 3; and an upwardly extending bulkhead 6 disposed on the core support 13 so as to surround the core 2, the core barrel 3 and the reflector 4 from the lateral side. The reflector 4 is composed of a neutron reflecting part 4*a* and a hollow cavity part 4*b*. An inert gas or a metal having a lower neutron reflection ability than that of the primary coolant 21 is enclosed in the hollow space of the cavity part 4*b*.

In addition, as shown in FIG. 1, disposed between an inner surface of the reactor vessel 7 and the bulkhead 6 is an annular intermediate heat exchanger 15 configured to cool the primary coolant 21 which has been heated by the core 2. A pump for coolant, e.g., an annular electromagnetic pump 14 configured to pressurize the primary coolant 21 that has passed through the intermediate heat exchanger 15 so as to be cooled is disposed between the inner surface of the reactor vessel 7 and the bulkhead 6 at a position near to the intermediate heat exchanger 15.

A neutron shield 8 is disposed between the inner surface of the reactor vessel 7 and the bulkhead 6 at a position below the electromagnetic pump 14. As shown in FIG. 1, disposed between the neutron shield 8 and the electromagnetic pump 14 is an upper supporting plate 29 supporting the neutron shield 8 from above.

The bulkhead 6 is composed of a lower bulkhead 6*a* surrounding the core 2, core barrel 3 and the reflector 4 from the lateral side, and an upper bulkhead 6*b* surrounding the primary coolant 21 which has been heated by the core 2. The lower bulkhead 6*a* is mounted on the upper supporting plate 29 through a sealing member (not shown), such that the lower bulkhead 6*a* is slidable in an up and down direction. Thus, when the lower bulkhead 6*a* extends or contracts in the up and down direction by thermal expansion, the lower bulkhead 6*a* can be slid in the up and down direction with respect to the upper supporting plate 29.

Figure 2:
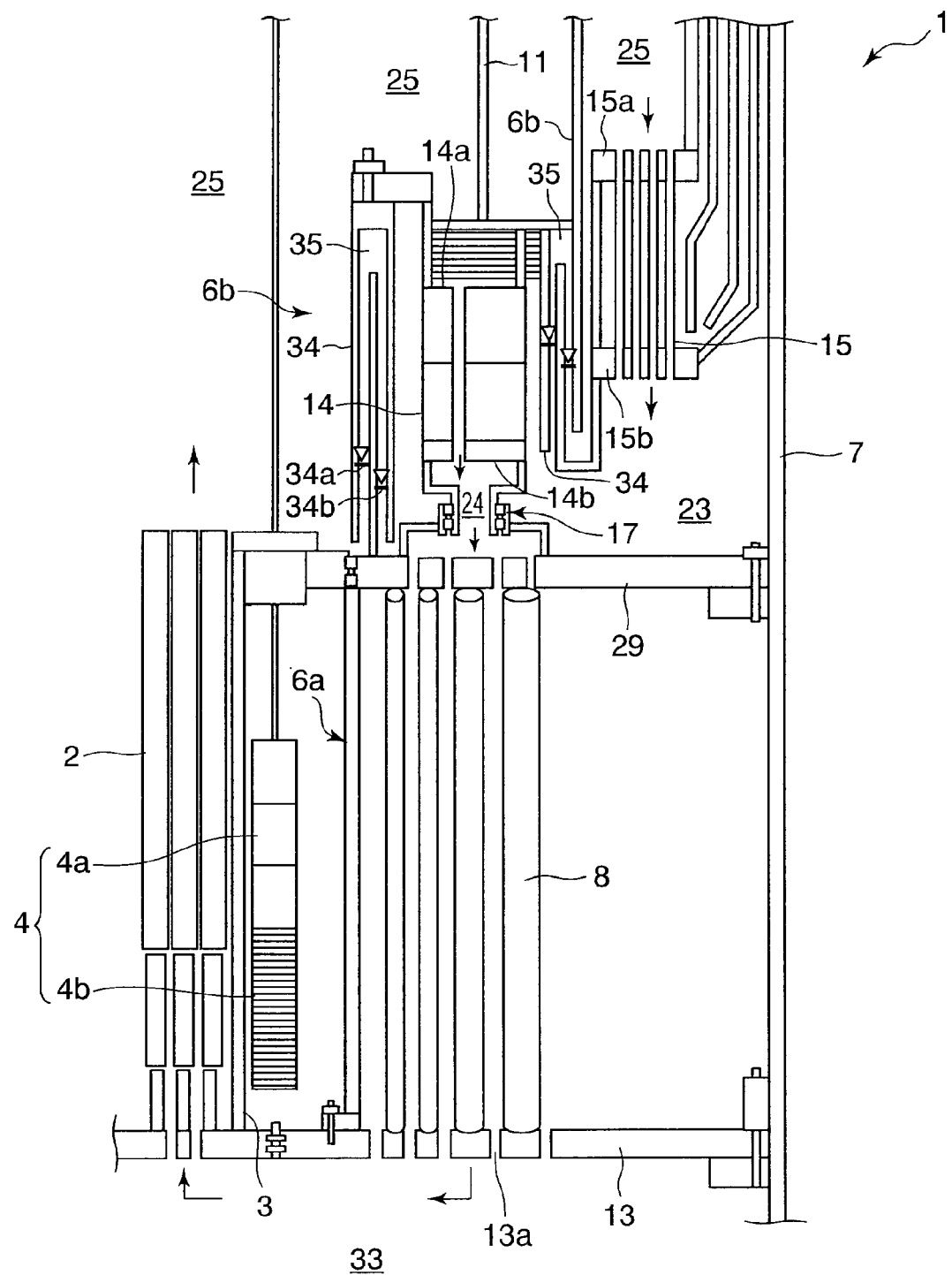
FIG. 2 is a view showing a sealing structure around an electromagnetic pump in the first embodiment of the present invention.

Next, a structure around the electromagnetic pump 14 is described with reference to FIG. 2. As shown in FIG. 2, the upper supporting plate 29 has an opening 29*a* through which the pressurized primary coolant 21 from the electromagnetic pump 14 passes. Between an outlet 14*b* of the electromagnetic pump 14 and the upper supporting plate 29, there is disposed a coolant guide mechanism 17 configured to guide the pressurized primary coolant 21 from the electromagnetic pump 14 toward the neutron shield 8 through the opening 29*a* of the upper supporting plate 29.

As described below, the primary coolant 21 guided toward the neutron shield 8 passes through an opening 13*a* of the core support 13 to flow into a lower plenum 33 shown in FIG. 2. Thereafter, the primary coolant 21 moves upward while cooling the core 2. The primary coolant 21 which has been heated by the core 2 reaches an upper plenum 32 shown in FIG. 1, and then flows into an inlet 15*a* of the intermediate heat exchanger 15 over the upper bulkhead 6*b*. After the primary coolant 21 has been cooled in the intermediate heat exchanger 15, the primary coolant 21 outflows from an outlet 15*b* of the intermediate heat exchanger 15. Then, the primary coolant 21 is sucked into an inlet 14*a* of the inlet 14*a* of the electromagnetic pump 14. In this embodiment, as shown in FIG. 2, a zone filled with the primary coolant 21, which has been cooled by the intermediate heat exchanger 15 and is not yet pressurized by the electromagnetic pump 14, provides a lower temperature and lower pressure zone 23. Further, a zone filled with the primary coolant 21, which has been pressurized by the electromagnetic pump 14 and is not yet heated by the core 2, provides a lower temperature and higher pressure zone 24. Furthermore, a zone filled with the primary coolant 21, which has been heated by the core 2 and is not yet cooled by the intermediate heat exchanger 15, provides a higher temperature zone 25.

As shown in FIG. 2, when seen from above, the annular electromagnetic pump 14 is arranged on a position nearer to the core 2 than the intermediate heat exchanger 15, such that the annular electromagnetic pump 14 and the annular intermediate heat exchanger 15 do not overlap with each other. Thus, when the fast reactor 1 is repaired or maintained, the electromagnetic pump 14 can be independently pulled out upward, while the intermediate heat exchanger 15 remains in the fast reactor 1.

In general, since a failure rate of the electromagnetic pump 14 is higher than a failure rate of the intermediate heat exchanger 15, the electromagnetic pump 14 should be more frequently replaced. At this time, suppose that the intermediate heat exchanger 15 and the electromagnetic pump 14 are arranged to be overlapped with each other, when seen from above. Under such a structure, when the broken electromagnetic pump 14 is replaced, the electromagnetic pump 14 is pulled out together with the intermediate heat exchanger 15. In this case, since the electromagnetic pump 14 and the intermediate heat exchanger 15 are both radioactivated, not only the broken electromagnetic pump 14 but also the intermediate heat exchanger 15, which is not broken, should be replaced.

On the other hand, according to this embodiment, when seen from above, the annular electromagnetic pump 14 is arranged on a position nearer to the core 2 than the intermediate heat exchanger 15, such that the annular electromagnetic pump 14 and the annular intermediate heat exchanger 15 do not overlap with each other. Thus, as compared with the case in which the intermediate heat exchanger 15 and the electromagnetic pump 14 are arranged to be overlapped with each other, when seen from above, costs required for maintaining the fast reactor 1 can be reduced.

In addition, as shown in FIG. 2, concerning the upper bulkhead 6*b* of the bulkhead 6, which is located above the upper supporting plate 29, a part of the upper bulkhead 6*b*, which is located near to the electromagnetic pump 14 at a position nearer to the core 2 than the electromagnetic pump 14, and a part of the upper bulkhead 6*b*, which is located near to the electromagnetic pump 14 between the electromagnetic pump 14 and the intermediate heat exchanger 15, are respectively formed of manometerseals 34. Due to these manometer seals 34, at the position near to the electromagnetic pump 14, it can be securely prevented that the primary coolant 21 in the lower temperature and lower pressure zone 23 leaks to the higher temperature zone 25, and that the primary coolant 21 in the higher temperature zone 25 leaks to the lower temperature and lower pressure zone 23. In addition, the respective manometerseals 34 are filled with an inert gas 35, whereby the heat can be prevented from moving from the higher temperature zone 25 to the lower temperature and lower pressure zone 23.

Figure 3:
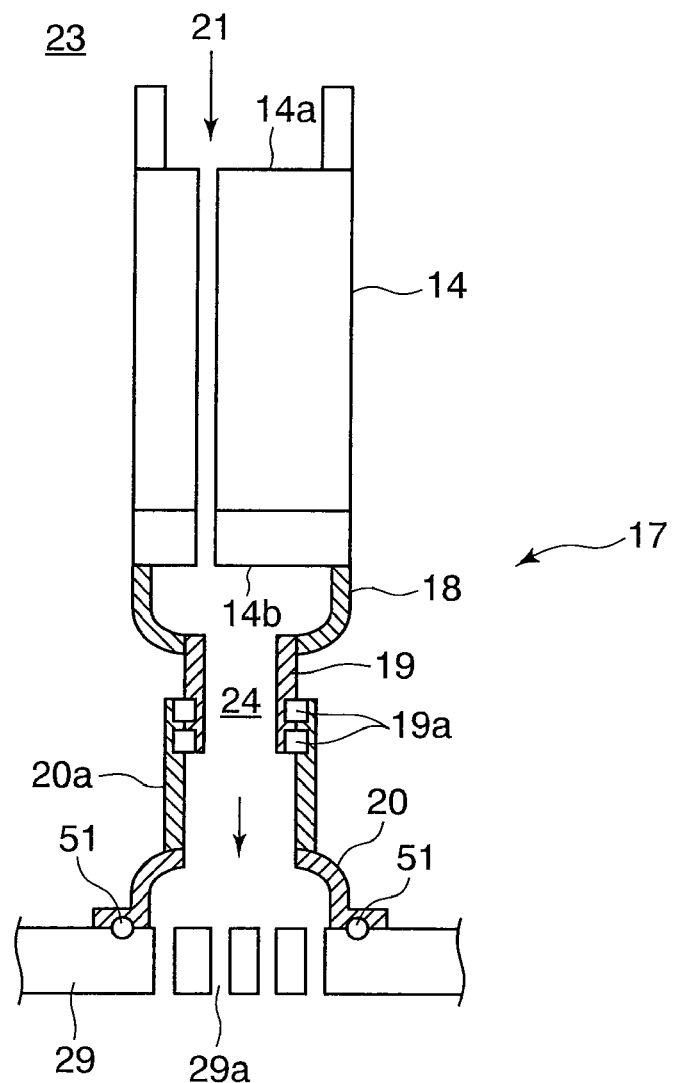
FIG. 3 is a view showing a coolant guide mechanism in the first embodiment of the present invention.
Figure 4A:
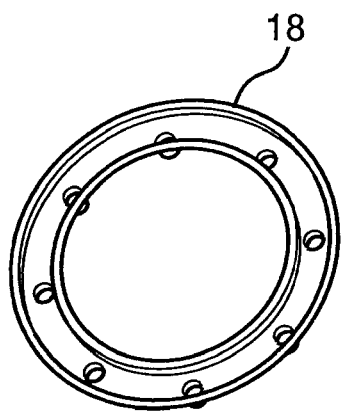
FIG. 4(*a*) is a view showing an upper header when seen from above in the first embodiment of the present invention.
Figure 4B:
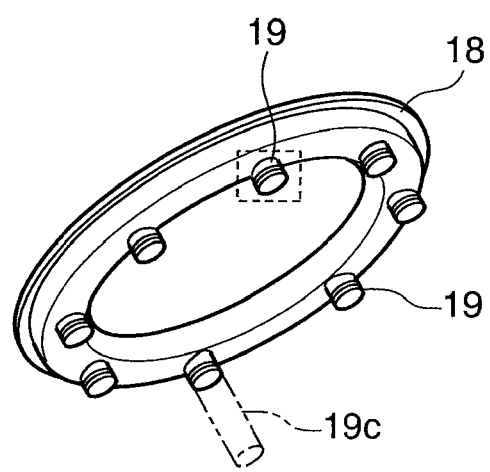
Figure 4C:
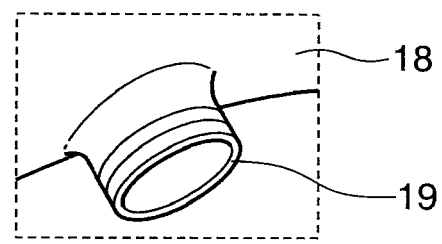

Next, the coolant guide mechanism 17 is described in detail, with reference to FIGS. 3 to 6. As shown in FIG. 3, the coolant guide mechanism 17 is composed of an annular upper header 18 mounted on the outlet 14*b* of the electromagnetic pump 14, and an annular lower header 20 disposed below the upper header 18 such that the lower header 20 is mounted on the upper supporting plate 29 so as to cover an opening 29*a* of the upper supporting plate 29 from above. As shown in FIGS. 4(*a*), 4(*b*) and 4(*c*), the upper header 18 is provided with a plurality of nozzles 19 in a circumferential direction thereof. Each of the nozzles 19 projects downward and passes therethrough the pressurized primary coolant 21 from the electromagnetic pump 14. As shown in FIGS. 5(*a*) and 5(*b*) and FIGS. 6(*a*) and 6(*b*), the lower header 20 is provided with a plurality of nozzle receivers 20*a* which are slidably engaged with the corresponding nozzles 19 of the upper header 18. Owing to such a coolant guide mechanism 17, the pressurized primary coolant 21 from the electromagnetic pump 14 can be guided toward the neutron shield 8 through the opening 29*a* of the upper supporting plate 29, with the pressurized primary coolant 21 from the electromagnetic pump 14 being shielded from the primary coolant 21 in the lower temperature and lower pressure zone 23.

As shown in FIG. 3, two annular seals 19*a* are interposed between the nozzles 19 and the nozzle receivers 20*a*. As shown in FIG. 3, a sealing member 51 is interposed between a lower surface of the lower header 20 and an upper surface of the upper supporting plate 29. Thus, the pressurized primary coolant 21 from the electromagnetic pump 14 can be more securely shielded from the primary coolant 21 in the lower temperature and lower pressure zone 23.

As shown by the two-dot chain lines in FIG. 4(*b*), at least one of the nozzles 19 of the upper header 18 may be formed by a longer nozzle 19*c* which is longer than the other nozzles 19.

Next, an operation of this embodiment as structured above is described. Herein, the flow of the primary coolant 21 in the fast reactor 1 is described.

After the primary coolant 21 which had been heated by the core 2, e.g., the primary coolant 21 of a temperature of about 500° C., has reached the upper plenum 32 shown in FIG. 1, the primary coolant 21 flows into the inlet 15*a* of the intermediate heat exchanger 15 over the upper bulkhead 6*b*. In the intermediate heat exchanger 15, the heat is exchanged between the primary coolant 21 and a secondary coolant 31 shown in FIG. 1, whereby the primary coolant 21 is cooled and the secondary coolant 31 is heated. The temperature of the primary coolant 21, which has been cooled in the intermediate heat exchanger 15, is about 350° C., for example.

The primary coolant 21, which has been cooled in the intermediate heat exchanger 15, outflows from the outlet 15*b* of the intermediate heat exchanger 15. Then, the primary coolant 21 is sucked into the inlet 14*a* of the electromagnetic pump 14. The primary coolant 21 having been sucked into the inlet 14*a* of the electromagnetic pump 14 is pressurized at the electromagnetic pump 14. Thereafter, the primary coolant 21 is discharged from the outlet 14*b* of the electromagnetic pump 14. The primary coolant 21 having been discharged from the outlet 14*b* of the electromagnetic pump 14 is guided toward the neutron shield 8 through the coolant guide mechanism 17 and the opening 29*a* of the upper supporting plate 29.

The primary coolant 21 having been guided toward the neutron shield 8 then flows into the lower plenum 33 shown in FIGS. 1 and 2 through the opening 13*a* of the core support 13. After that, as shown in FIGS. 1 and 2, the primary coolant 21 moves upward while cooling the core 2.

Upon discharge of the pressurized primary coolant 21 of about 350° C. from the outlet 14*b* of the electromagnetic pump 14, the primary coolant 21 having been discharged from the outlet 14*b* of the electromagnetic pump 14 is guided by the coolant guide mechanism 17 toward the neutron shield 8 through the opening 29*a* of the upper supporting plate 29. Outside the coolant guide mechanism 17, there is formed the lower temperature and lower pressure zone 23 that is filled with the primary coolant 21 of about 350° C., which is not yet pressurized. The lower temperature and lower pressure zone 23 is in contact with the higher temperature zone 25, which is filled with the primary coolant 21 of about 500° C. that has been heated by the core 2, through the upper bulkhead 6*b*. Namely, the lower temperature and higher pressure zone 24, which is filled with the pressurized primary coolant 21 of about 350° C., is not in contact with the higher temperature zone 25, which is filled with the primary coolant 21 of about 500° C. that has been heated by the core 2, through the upper bulkhead 6*b*. Thus, it can be prevented that the pressurized primary coolant 21 of about 350° C. leaks to the higher temperature zone 25, and that a pressure difference between the lower temperature and higher pressure zone 24 and the higher temperature zone 25 is applied to the upper bulkhead 6*b*. As a result, lowering of a power generation efficiency of the fast reactor 1 can be prevented, as well as reliability of the fast reactor 1 can be enhanced.

In this embodiment, the higher temperature zone 25 and the lower temperature and lower pressure zone 23 are in contact with each other through the upper bulkhead 6*b*. Here, a pressure difference between the higher temperature zone 25 and the lower temperature and lower pressure zone 23, which is about several Kpa, is substantially equal to a pressure loss in the intermediate heat exchanger 15. Thus, as shown in FIG. 2, when the manometerseal 34 is used as the upper bulkhead 6b, a difference in height between a liquid level 34a in the higher temperature zone 25 and a liquid level 34b in the lower temperature and lower pressure zone 23 is about several hundreds mm. Thus, leakage of the primary coolant 21 between the higher temperature zone 25 and the zone 23 of a lower temperature and a lower temperature can be substantially made zero.

According to this embodiment, between the outlet 14b of the electromagnetic pump 14 and the upper supporting plate 29, there is provided the coolant guide mechanism 17 configured to guide the pressurized primary coolant 21 from the electromagnetic pump 14 toward the neutron shield 8 through the opening 29a of the upper supporting plate 29. Thus, the primary coolant 21 of a lower temperature, which has been cooled by the intermediate heat exchanger 15 and pressurized by the electromagnetic pump 14, can be guided by the coolant guide mechanism 17 toward the neutron shield 8 through the opening 29a of the upper supporting plate 29. Therefore, there is no possibility that the primary coolant 21 of a lower temperature, which has been pressurized by the electromagnetic pump 14, leaks to the primary coolant 21 of a higher temperature, which has been heated by the core 2, through the bulkhead, whereby it is possible to improve a sealing property between the primary coolant 21 of a lower temperature, which has been pressurized by the electromagnetic pump 14, and the primary coolant 21 of a higher temperature, which has been heated by the core 2. As a result, lowering of a power generation efficiency of the fast reactor 1 can be prevented, as well as reliability of the fast reactor 1 can be enhanced.

In addition, according to this embodiment, the coolant guide mechanism 17 is composed of the annular upper header 18 mounted on the outlet 14b of the electromagnetic pump 14, and the annular lower header 20 disposed below the upper header 18 such that the lower header 20 is mounted on the upper supporting plate 29 so as to cover the opening 29a of the upper supporting plate 29 from above. The upper header 18 is provided with a plurality of nozzles 19 in a circumferential direction thereof. Each of the nozzles 19 projects downward and passes therethrough the pressurized primary coolant 21 from the electromagnetic pump 14. The lower header 20 is provided with a plurality of nozzle receivers 20a which are slidably engaged with the corresponding nozzles 19 of the upper header 18. In addition, the two annular seals 19a are interposed between the nozzles 19 and the nozzle receivers 20a. Thus, it can be prevented that the pressurized primary coolant 21 from the electromagnetic pump 14 leaks to the lower temperature and lower pressure zone 23, which is filled with the primary coolant 21 that is not yet pressurized.

In addition, according to this embodiment, when seen from above, the annular electromagnetic pump 14 is arranged on a position nearer to the core 2 than the intermediate heat exchanger 15, such that the annular electromagnetic pump 14 and the annular intermediate heat exchanger 15 do not overlap with each other. Thus, when the fast reactor 1 is repaired or maintained, the electromagnetic pump 14 can be independently pulled out upward, while the intermediate heat exchanger 15 remains in the fast reactor 1. Thus, as compared with the case in which the intermediate heat exchanger 15 and the electromagnetic pump 14 are arranged to be overlapped with each other, when seen from above, costs required for maintaining the fast reactor 1 can be reduced.

In addition, according to this embodiment, a part of the upper bulkhead 6b, which is located near to the electromagnetic pump 14 at a position nearer to the core 2 than the electromagnetic pump 14, and a part of the upper bulkhead 6b, which is located near to the electromagnetic pump 14 between the electromagnetic pump 14 and the intermediate heat exchanger 15, are respectively formed of the manometerseals 34. Due to these manometerseals 34, at the position near to the electromagnetic pump 14, it can be securely prevented that the primary coolant 21 in the lower temperature and lower pressure zone 23 leaks to the higher temperature zone 25, and that the primary coolant 21 in the higher temperature zone 25 leaks to the lower temperature and lower pressure zone 23. In addition, the respective manometerseals 34 are filled with the inert gas 35, whereby the heat can be prevented from moving from the higher temperature zone 25 to the lower temperature and lower pressure zone 23.

In this embodiment, the pump for coolant is formed of the electromagnetic pump 14, which is by way of example. However, not limited thereto, a mechanical pump or another pump may be used as the pump for coolant.

In addition, in this embodiment, the annular intermediate heat exchanger 15 and the annular electromagnetic pump 14 are provided, which is by way of example. However, not limited thereto, a plurality of intermediate heat exchangers 15 and a plurality of electromagnetic pumps 14 may be circumferentially arranged. In this case, the electromagnetic pump 14 can be pulled out upward more easily.

In addition, in this embodiment, a part of the upper bulkhead 6b, which is located near to the electromagnetic pump 14 at a position nearer to the core 2 than the electromagnetic pump 14, and a part of the upper bulkhead 6b, which is located near to the electromagnetic pump 14 between the electromagnetic pump 14 and the intermediate heat exchanger 15, are respectively formed of the manometerseals 34, which is by way of example. However, not limited thereto, the manometerseal 34 may be used only on one of a part which is located near to the electromagnetic pump 14 at a position nearer to the core 2 than the electromagnetic pump 14, and a part which is located near to the electromagnetic pump 14 between the electromagnetic pump 14 and the intermediate heat exchanger 15.

In addition, in this embodiment, when a flowmeter (not shown) is placed on a lower end of the electromagnetic pump 14, the upper header 18 may be placed below the flowmeter.

Second Embodiment

Figure 7:
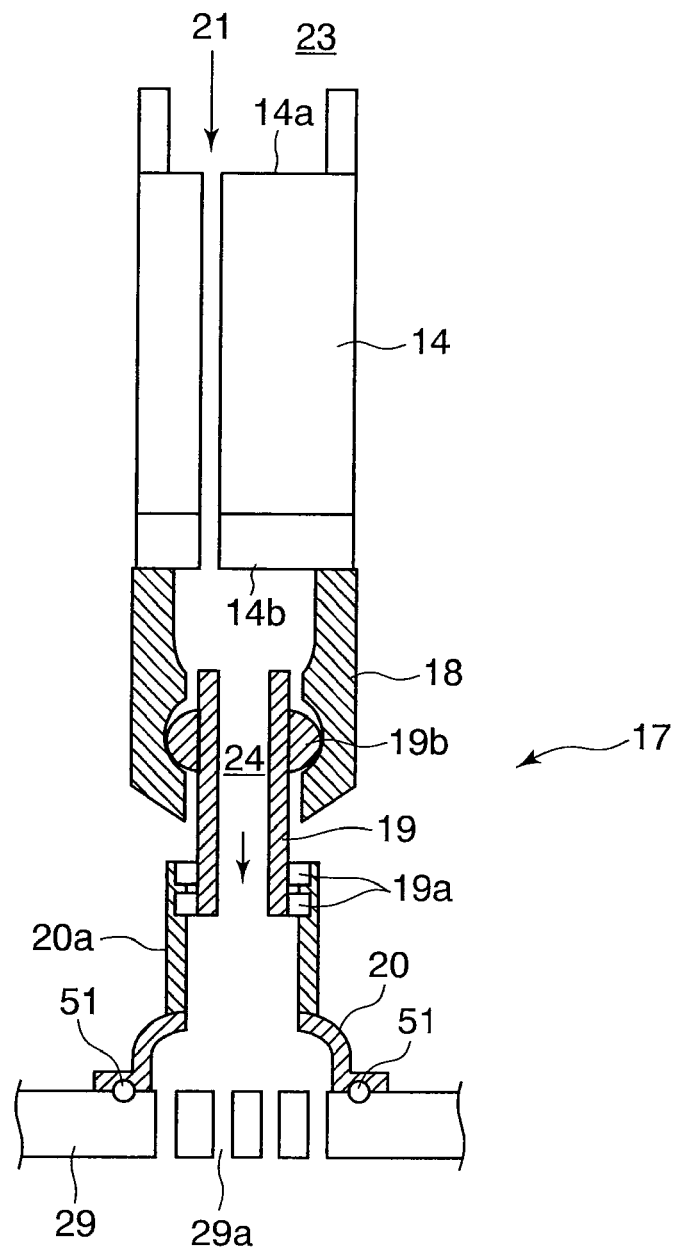
FIG. 7 is a view showing a coolant guide mechanism in a second embodiment of the present invention.

Next, a second embodiment of the present invention is described with reference to FIG. 7. FIG. 7 is a view showing a coolant guide mechanism in the second embodiment of the present invention.

The second embodiment shown in FIG. 7 is substantially the same as the first embodiment shown in FIGS. 1 to 6, excluding that respective nozzles are connected to an upper header through spherical seating seals. In the second embodiment shown in FIG. 7, the same elements as those of the first embodiment shown in FIGS. 1 to 6 are shown by the same reference numbers, and detailed description thereof is omitted.

As shown in FIG. 7, respective nozzles 19 of a coolant guide mechanism 17 are connected to an upper header 18 through spherical seating seals 19b. Thus, each nozzle 19 can be optionally inclined within a predetermined range with respect to the upper header 18. Therefore, a manufacturing tolerance and an installation tolerance of the coolant guide mechanism 17 can be absorbed, as well as a structural deformation of the coolant guide mechanism 17, which is caused during the operation of a fast reactor 1, can be absorbed. In addition, alignment of each nozzle 19 with a corresponding nozzle receiver 20a of a lower header 20 can be facilitated.

According to this embodiment, the respective nozzles 19 of the coolant guide mechanism 17 are connected to the upper header 18 through the spherical seating seals 19b. Thus, it can be prevented that the pressurized primary coolant 21 from the electromagnetic pump 14 leaks to the lower temperature and lower pressure zone 23, which is filled with the primary coolant 21 that is not yet pressurized. In addition, installation of the fast reactor 1 can be facilitated, and maintainability of the fast reactor 1 can be enhanced.

Third Embodiment

Figure 8:
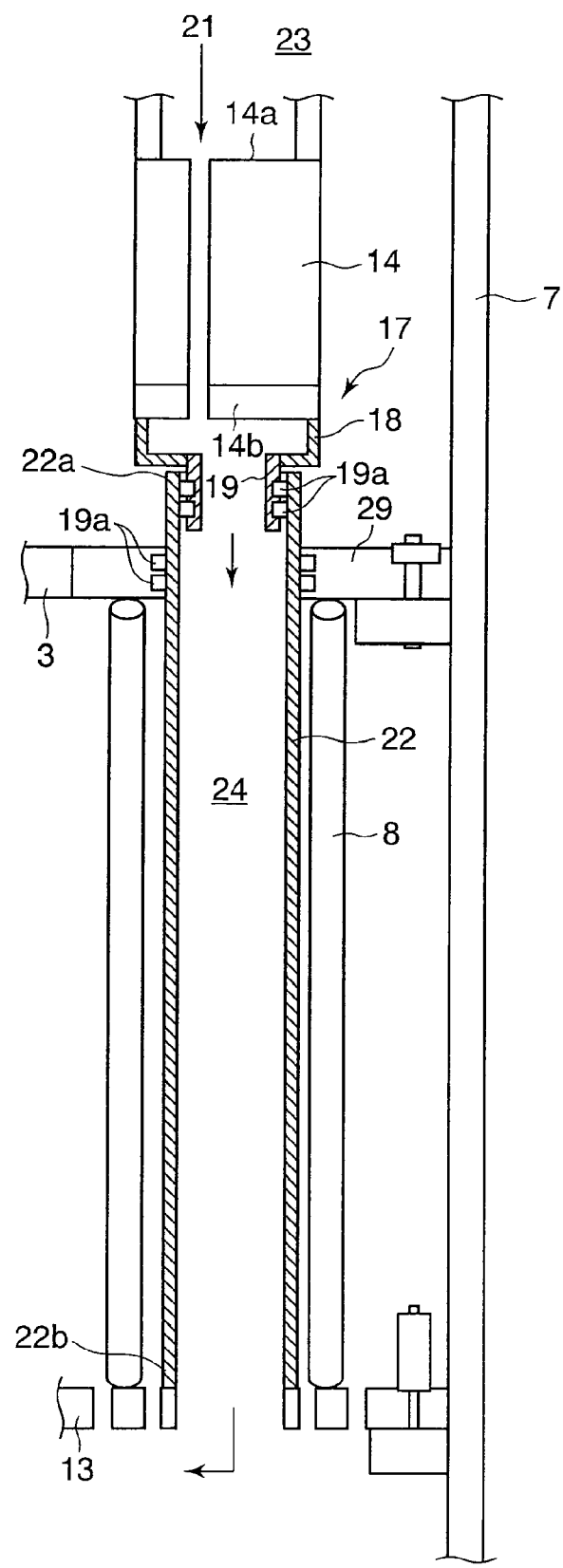
FIG. 8 is a view showing a coolant guide mechanism in a third embodiment of the present invention.

Next, a third embodiment of the present invention is described with reference to FIG. 8. FIG. 8 is a view showing a coolant guide mechanism in the third embodiment of the present invention.

The third embodiment shown in FIG. 8 is substantially the same as the first embodiment shown in FIGS. 1 to 6, excluding that the coolant guide mechanism includes a pipe passing through an upper supporting plate, with one end of the pipe being engaged with an upper header, and the other end thereof being connected to a core support. In the third embodiment shown in FIG. 8, the same elements as those of the first embodiment shown in FIGS. 1 to 6 are shown by the same reference numbers, and detailed description thereof is omitted.

As shown in FIG. 8, a coolant guide mechanism 17 includes an annular upper header 18 mounted on an outlet 14b of an electromagnetic pump 14, and a pipe 22 passing through an upper supporting plate 29, with one end 22a of the pipe 22 being engaged with the upper header 18 and the other end 22b of the pipe 22 being connected to a core support 13. The upper header 18 is provided with downwardly projecting nozzles 19 through which a pressurized primary coolant 21 from the electromagnetic pump 14 passes. The one end 22a of the pipe is slidably engaged with the nozzles of the upper header 18 through two annular seals 19a.

According to this embodiment, there is provided the pipe 22 passing through the upper supporting plate 29, with the one end 22a being slidably engaged with the upper header and the other end 22b being connected to the core support 13. Since the outlet 14b of the electromagnetic pump 14 and the upper supporting plate 29 are connected to each other through the pipe 22, the primary coolant 21 can be guided up to a lower plenum 33 without diminishing its flow rate. Thus, the efficiency of a fast reactor 1 can be enhanced, as well as the sealing structure between the upper supporting plate 29 and the core barrel 3 can be facilitated.

Fourth Embodiment

Figure 9:
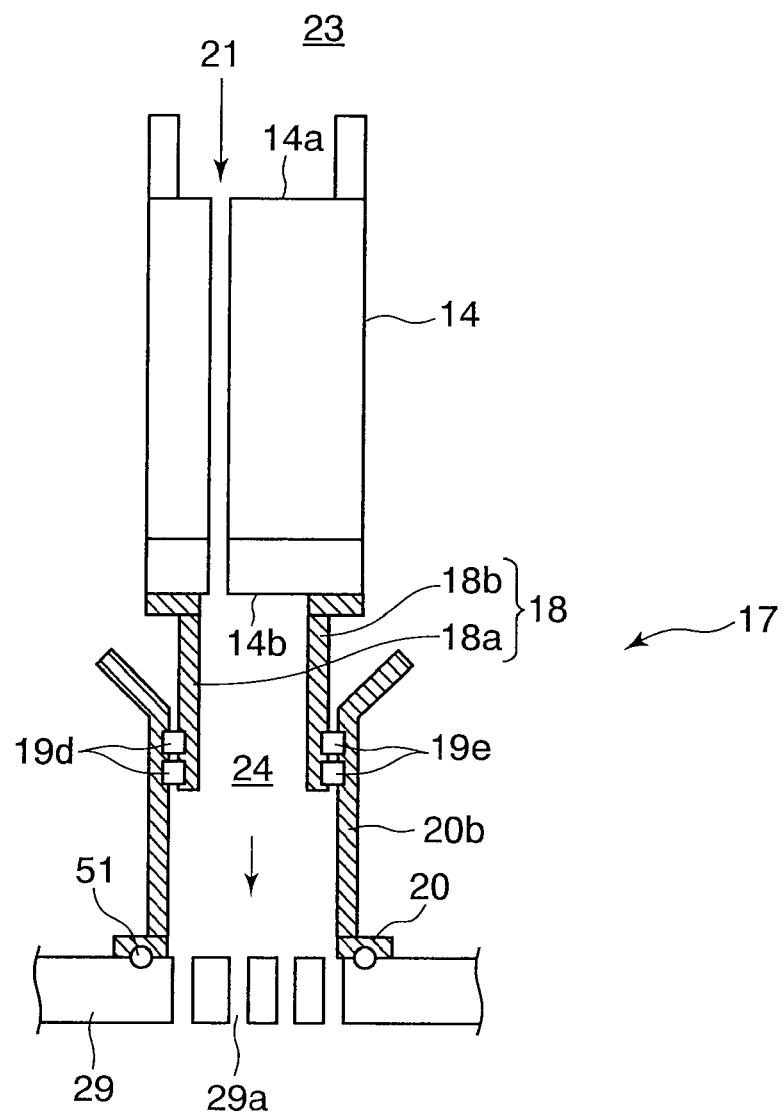
FIG. 9 is a view showing a coolant guide mechanism in a fourth embodiment of the present invention.

Next, a fourth embodiment of the present invention is described with reference to FIG. 9. FIG. 9 is a view showing a coolant guide mechanism in the fourth embodiment of the present invention.

The fourth embodiment shown in FIG. 9 is substantially the same as the first embodiment shown in FIGS. 1 to 6, excluding that an upper header includes an annular inner wall extending downwardly from an outlet of an electromagnetic pump and an annular outer wall extending downwardly from the outlet of the electromagnetic pump, and that a lower header includes an annular receiving part slidably engaged with the inner wall of the upper header and the upper wall thereof. In the fourth embodiment shown in FIG. 9, the same elements as those of the first embodiment shown in FIGS. 1 to 6 are shown by the same reference numbers, and detailed description thereof is omitted.

As shown in FIG. 9, a coolant guide mechanism 17 is composed of an annular upper header 18 mounted on an outlet 14b of an electromagnetic pump 14, and an annular lower header 20 disposed below the upper header 18 such that the lower header 20 is mounted on an upper supporting plate 29 so as to cover an opening 29a of the upper supporting plate 29 from above. The upper header 18 includes an annular inner wall 18a extending downwardly from the outlet 14b of the electromagnetic pump 14, and an annular outer wall 18b extending downwardly from the outlet 14b of the electromagnetic pump 14. In addition, formed on the lower header 20 is an annular receiving part 20b slidably engaged with the inner wall 18a of the upper header 18 and the outer wall 18b thereof. Two annular seals 19d are interposed between the annular inner wall 18a and an inner side surface of the annular receiving part 20b. Two annular seals 19e are interposed between the annular outer wall 18b and an outer side surface of the annular receiving part 20b.

Figure 10:
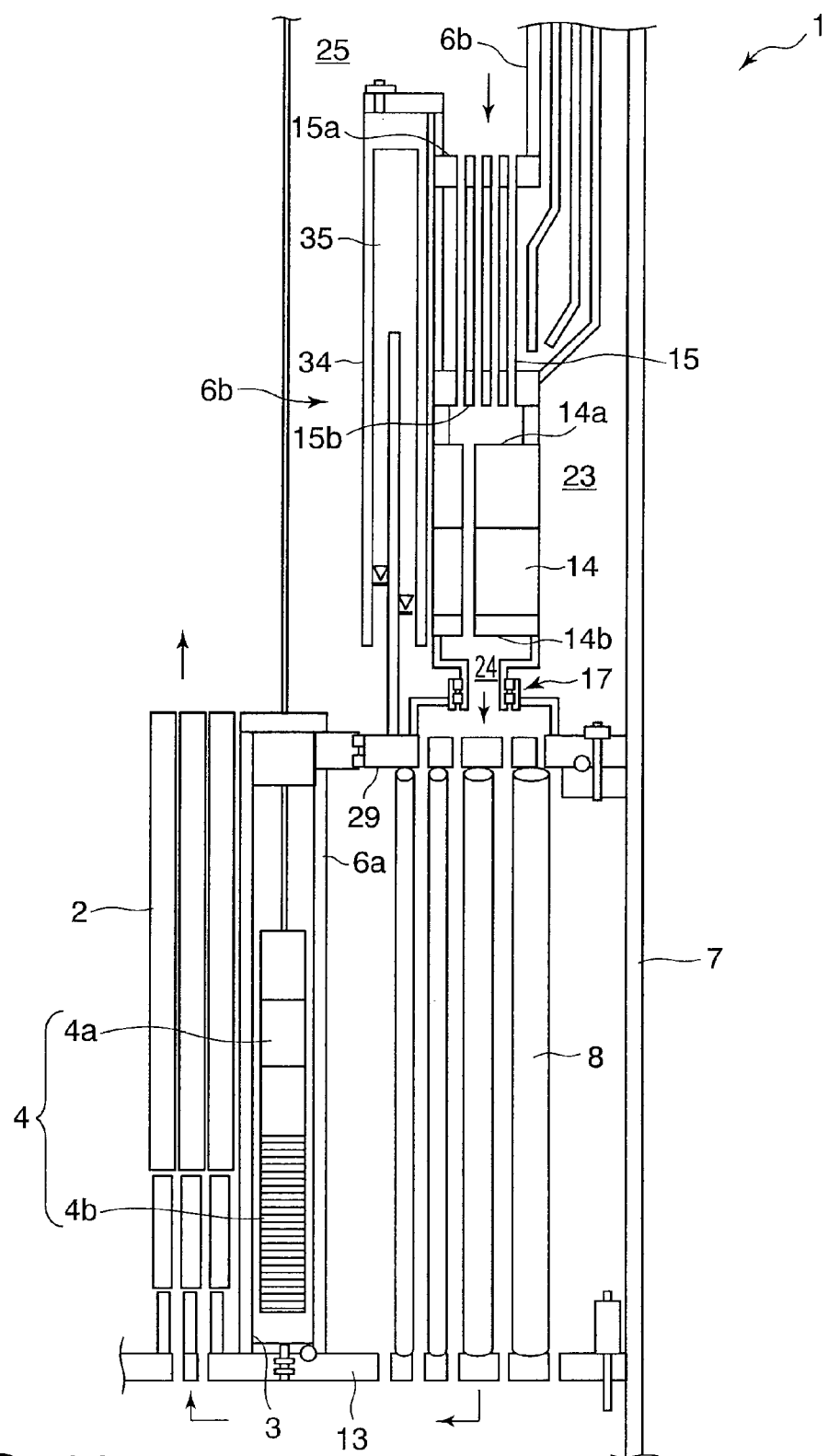
FIG. 10 is a view showing a sealing structure around an electromagnetic pump in a fifth embodiment of the present invention.

According to this embodiment, the upper header 18 includes the annular inner wall 18a extending downwardly from the outlet 14b of the electromagnetic pump 14, and the annular outer wall 18b extending downwardly from the outlet 14b of the electromagnetic pump 14. In addition, formed on the lower header 20 is the annular receiving part 20 slidably engaged with the inner wall 18a and the outer wall 18b of the upper header 18. Since the structures of the upper header 18 and the lower header 20 can be simplified, reduction in cost can be achieved Fifth Embodiment Next, a fifth embodiment of the present invention is described with reference to FIG. 10. FIG. 10 is a view showing a sealing structure around an electromagnetic pump in the fifth embodiment of the present invention.

The fifth embodiment shown in FIG. 10 is substantially the same as the first embodiment shown in FIGS. 1 to 6, excluding that an intermediate heat exchanger and an electromagnetic pump are connected in series with each other in an up and down direction. In the fifth embodiment shown in FIG. 10, the same elements as those of the first embodiment shown in FIGS. 1 to 6 are shown by the same reference numbers, and detailed description thereof is omitted.

As shown in FIG. 10, in a fast reactor 1, an intermediate heat exchanger 15 and an electromagnetic pump 14 are connected in series with each other in an up and down direction. Similarly to the first embodiment shown in FIGS. 1 to 6, between an outlet 14b of the electromagnetic pump 14 and an upper supporting plate 29, there is disposed a coolant guide mechanism 17 configured to guide a pressurized primary coolant 21 from the electromagnetic pump 14 toward a neutron shield 8 through an opening 29a of the upper supporting plate 29. Thus, it is possible to improve a sealing property between the primary coolant 21 of a higher temperature, which has been heated by a core 2, and the primary coolant 21 of a lower temperature, which has been pressurized by the electromagnetic pump 14. As a result, lowering of a power generation efficiency of the fast reactor 1 can be prevented, as well as reliability of the fast reactor 1 can be enhanced.

Sixth Embodiment

Figure 11:
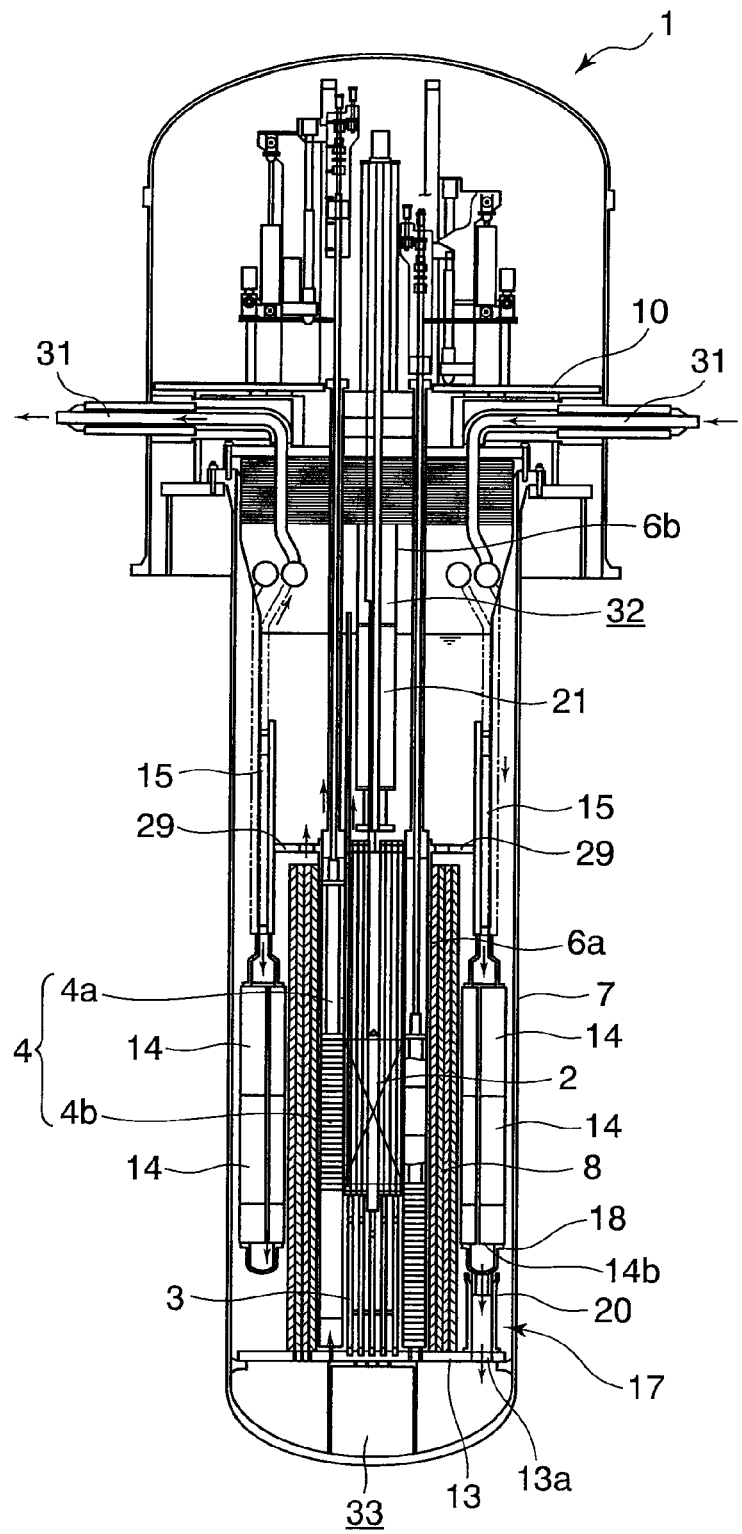
FIG. 11 is a view showing a fast reactor in a sixth embodiment of the present invention.

Next, a sixth embodiment of the present invention is described with reference to FIG. 11. FIG. 11 is a view showing a fast reactor in the sixth embodiment of the present invention.

In the aforementioned respective embodiments, a core supporting mechanism disposed in the reactor vessel, which horizontally extends so as to support the core is formed of the upper supporting plate, and the coolant guide mechanism configured to guide the pressurized coolant from the pump for coolant is connected to the opening of the upper supporting plate, which is by way of example. However, not limited thereto, the core supporting mechanism may be formed of a core support supporting the core from below and having an opening to which a coolant guide mechanism is connected. Herebelow, a fast reactor in the sixth embodiment of the present invention is described with reference to FIG. 11. In the sixth embodiment shown in FIG. 11, the same elements as those of the first embodiment shown in FIGS. 1 to 6 are shown by the same reference numbers, and detailed description thereof is omitted.

As shown in FIG. 11, an annular intermediate heat exchanger 15 configured to cool a primary coolant 21 which has been heated by a core 2 is disposed between an upper supporting plate 29 and an inner surface of a reactor vessel 7. As shown in FIG. 11, an annular electromagnetic pump 14, which is configured to pressurize the primary coolant that has passed through the intermediate heat exchanger 15 so as to be cooled, is disposed around a core 2. The electromagnetic pump 14 is connected in series with the intermediate heat exchanger 15 in an up and down direction. In addition, as shown in FIG. 11, a plurality of, e.g., two annular electromagnetic pumps 14 are connected in series with each other in the up and down direction. Due to this structure, as compared with the first to fifth embodiments, the height of the fast reactor 1 can be shortened. Thus, a material used for the reactor vessel 7 and the like of the fast reactor 1 can be reduced, whereby costs for the fast reactor 1 can be further reduced. In addition, since the height of the fast reactor 1 is shortened, the fast reactor 1 can be further stabilized, whereby a quake-resistance or the like of the fast reactor 1 can be improved.

As shown in FIG. 11, a core support 13 supporting the core 2 from below is provided with an opening 13a through which the pressurized coolant 21 from the electromagnetic pump 14 passes. In addition, as shown in FIG. 11, between an outlet 14b of the electromagnetic pump 14 and the core support 13, there is disposed a coolant guide mechanism 17 configured to guide a pressurized primary coolant 21 from the electromagnetic pump 14 toward a lower plenum 33 through the opening 13a of the core support 13. Thus, the primary coolant 21 can be separated from its circumference by the coolant guide mechanism 17, from when the primary coolant 21 is discharged from the electromagnetic pump 14 until when the primary coolant 21 reaches the opening 13a of the core support 13. Therefore, it can be prevented that the pressurized primary coolant 21 of about 350° C. leaks to the higher temperature zone 25, and that a pressure difference between the lower temperature and higher pressure zone 24 and the higher temperature zone 25 is applied to the lower bulkhead 6a. As a result, lowering of a power generation efficiency of the fast reactor 1 can be prevented, as well as reliability of the fast reactor 1 can be enhanced.

In this embodiment, the configuration of the coolant guide mechanism 17 shown in FIG. 11 is not particularly limited. For example, similarly to the first embodiment shown in FIGS. 1 to 6, the coolant guide mechanism 17 may be composed of an annular upper header 18 mounted on the outlet 14b of the electromagnetic pump 14, and an annular lower header 20 disposed below the upper header 18 such that the lower header 20 is mounted on the core support 13 so as to cover an opening 13a of the core support 13 from above. Herein, the upper header 18 may be provided with a plurality of nozzles 19 in a circumferential direction thereof. Each of the nozzles 19 projects downward and passes therethrough the pressurized primary coolant 21 from the electromagnetic pump 14. In addition, the lower header 20 may be provided with a plurality of nozzle receivers 20a which are slidably engaged with the corresponding nozzles 19 of the upper header 18. In this case, similarly to the second embodiment shown in FIG. 7, the respective nozzles 19 may be connected to the upper header 18 through the spherical seating seals 19b.

Alternatively, similarly to the fourth embodiment shown in FIG. 9, the upper header 18 may include the annular inner wall 18a extending downwardly from the outlet 14b of the electromagnetic pump 14, and the annular outer wall 18b extending downwardly from the outlet 14b of the electromagnetic pump 14. In addition, formed on the lower header 20 may be the annular receiving part 20b slidably engaged with the inner wall 18a of the upper header 18 and the outer wall 18b thereof.

Seventh Embodiment

Figure 12:
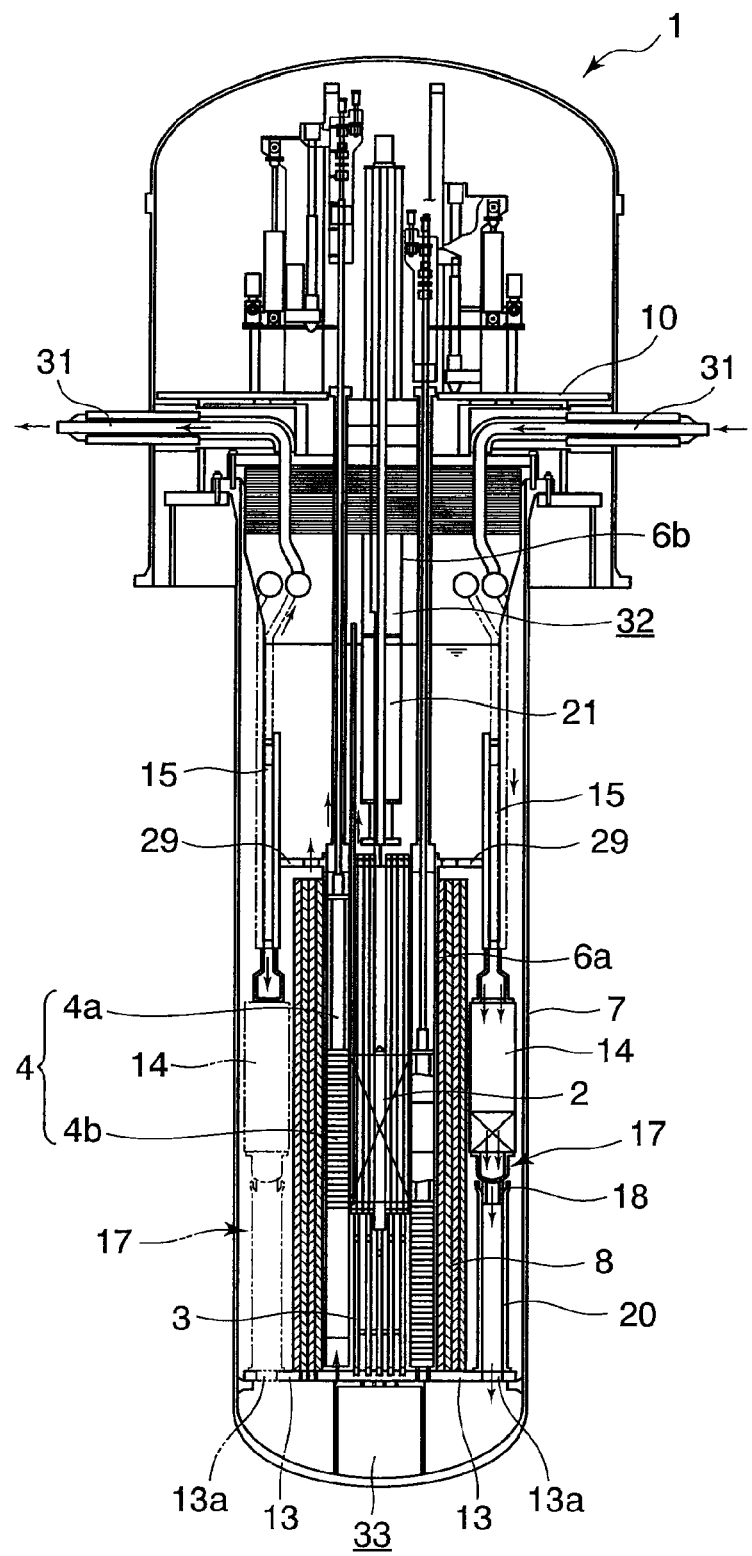
FIG. 12 is a view showing a fast reactor in a seventh embodiment of the present invention.

Next, a seventh embodiment of the present invention is described with reference to FIG. 12. FIG. 12 is a view showing a fast reactor in the seventh embodiment of the present invention.

The seventh embodiment shown in FIG. 12 is substantially the same as the sixth embodiment shown in FIG. 11, excluding that a pump for coolant includes a plurality of pumps (mechanical pumps, electromagnetic pumps, etc.) disposed around a core. In the seventh embodiment shown in FIG. 12, the same elements as those of the sixth embodiment shown in FIG. 11 are shown by the same reference numbers, and detailed description thereof is omitted.

As shown in FIG. 12, an annular intermediate heat exchanger 15 configured to cool a primary coolant 21 which has been heated by a core 2 is disposed between an upper supporting plate 29 and an inner surface of a reactor vessel 7. The heat exchanger 15 is structured such that the heat exchanger 15 can be connected in series with a plurality of electromagnetic pumps 14 disposed around the core 2 in an up and down direction. For example, as shown in the right side of FIG. 12, the one electromagnetic pump 14 disposed around the core 2 is connected in series with the intermediate heat exchanger 15 in the up and down direction. In addition, as shown in the left side of FIG. 12, the other electromagnetic pump 14 may be connected in series with the intermediate heat exchanger 15 in the up and down direction. The number of the electromagnetic pumps 14 to be disposed around the core 2 can be suitably set depending on the specification of the fast reactor 1.

As shown in FIG. 12, between an outlet 14b of an electromagnetic pump 14 and a core support 13, there is disposed a coolant guide mechanism 17 configured to guide a pressurized primary coolant 21 from the electromagnetic pump 14 toward a lower plenum 33 through an opening 13a of the core support 13. Thus, the primary coolant 21 can be separated from its circumference by the coolant guide mechanism 17, from when the primary coolant 21 is discharged from the electromagnetic pumps 14 until when the primary coolant 21 reaches the opening 13a of the core support 13. Therefore, it can be prevented that the pressurized primary coolant 21 of about 350° C. leaks to a higher temperature zone 25, and that a pressure difference between a lower temperature and higher pressure zone 24 and the higher temperature zone 25 is applied to an lower bulkhead 6a. As a result, lowering of a power generation efficiency of the fast reactor 1 can be prevented, as well as reliability of the fast reactor 1 can be enhanced.

Eighth Embodiment

Figure 13:
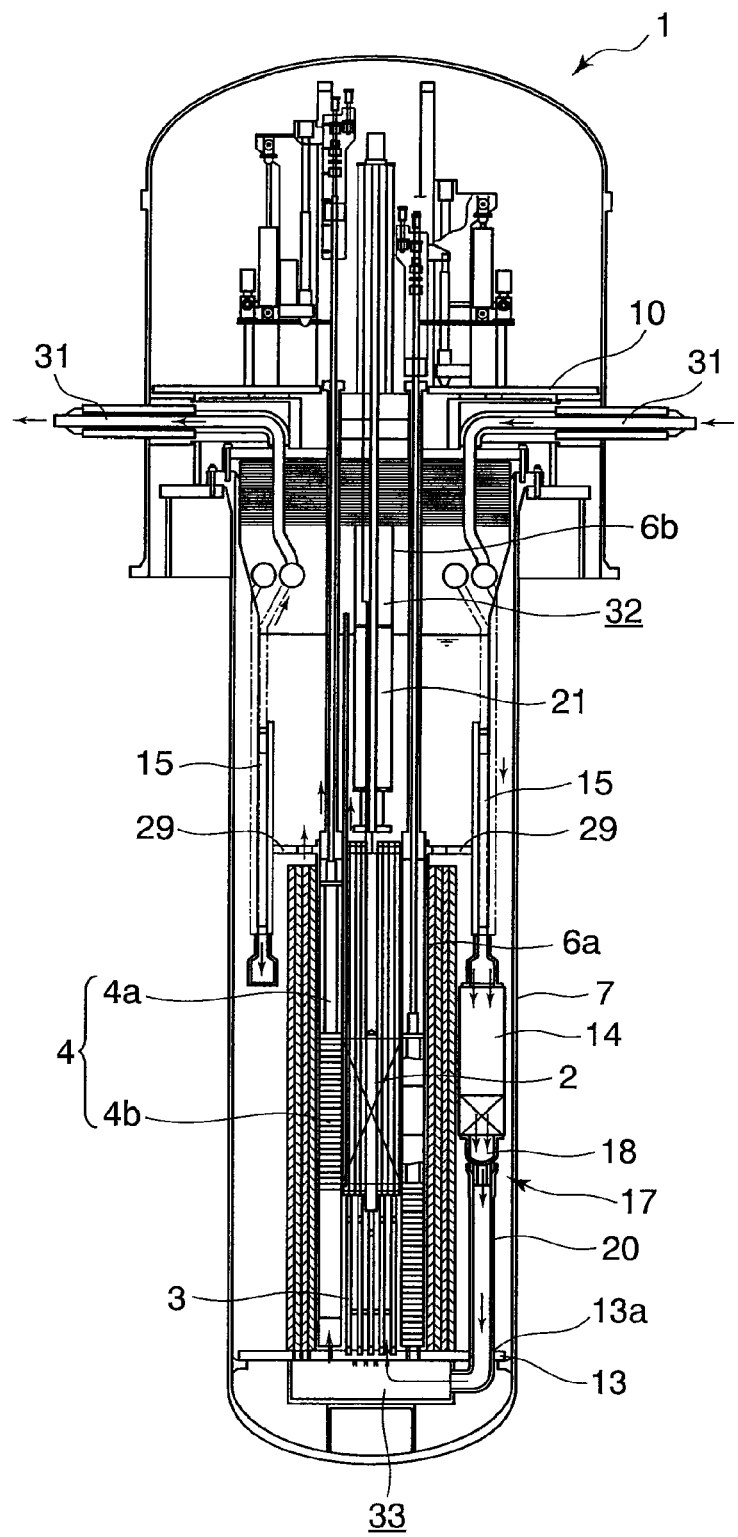
FIG. 13 is a view showing a fast reactor in an eighth embodiment of the present invention.

Next, an eight embodiment is described with reference to FIG. 13. FIG. 13 is a fast reactor in the eight embodiment of the present invention.

The eighth embodiment shown in FIG. 13 is substantially the same as the seventh embodiment shown in FIG. 12, excluding that a coolant guide mechanism is connected to a lower plenum disposed on a core support. In the eighth embodiment shown in FIG. 13, the same elements as those of the seventh embodiment shown in FIG. 12 are shown by the same reference numbers, and detailed description thereof is omitted.

As shown in FIG. 13, a coolant guide mechanism 17 includes an upper header 18 mounted on an outlet 14b of an electromagnetic pump 14, and a lower header 20 passing through an opening 13a of a core support 13, with one end of the lower header 20 being engaged with the upper header 18 and the other end thereof being connected to a lower plenum 33 of the core support 13. Since the outlet 14b of the electromagnetic pump 14 and the lower plenum 33 is connected to each other by means of the coolant guide mechanism 17, the primary coolant 21 can be guided up to the lower plenum 33 without diminishing its flow rate. Thus, the efficiency of a fast reactor 1 can be enhanced.

Ninth Embodiment

Figure 14:
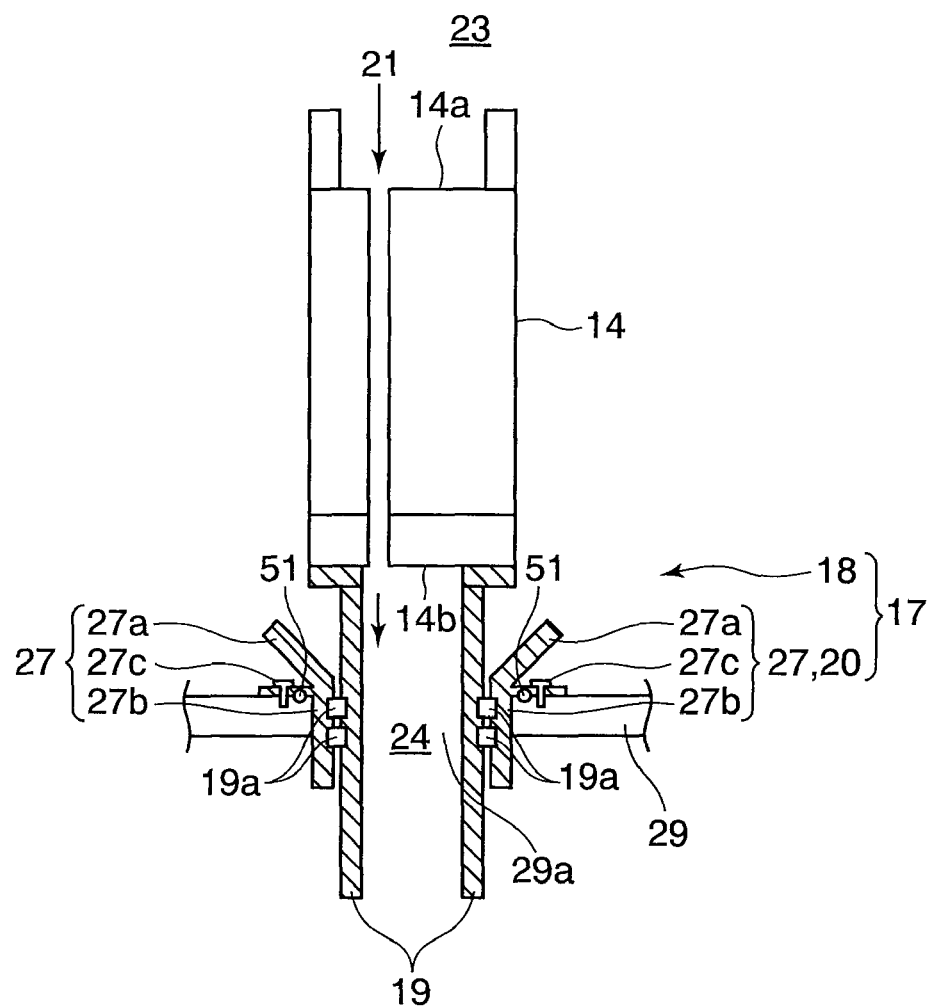
FIG. 14 is a view showing a fast reactor in a ninth embodiment of the present invention.
Figure 15:
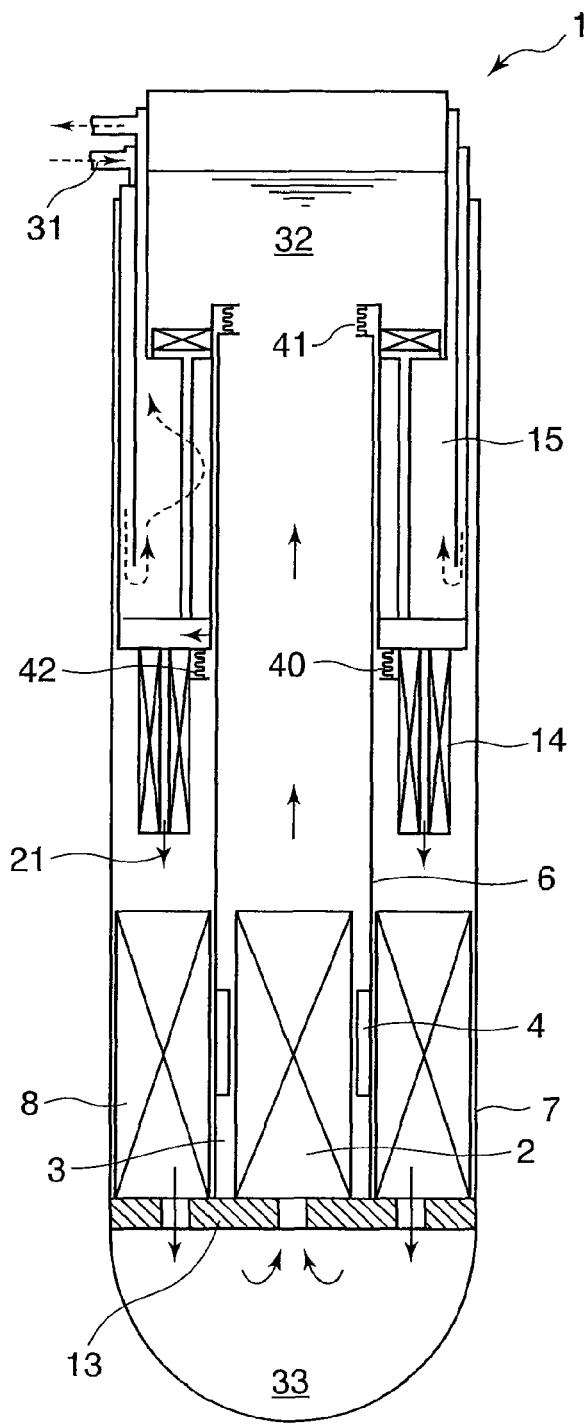
FIG. 15 is a view showing a conventional fast reactor.

Next, a ninth embodiment of the present invention is described with reference to FIG. 14. FIG. 14 is a fast reactor in the ninth embodiment of the present invention.

The ninth embodiment shown in FIG. 14 is substantially the same as the first embodiment shown in FIGS. 1 to 6, excluding that a lower header is formed of a nozzle receiver disposed on an upper supporting plate. In the ninth embodiment shown in FIG. 14, the same elements as those of the first embodiment shown in FIGS. 1 to 6 are shown by the same reference numbers, and detailed description thereof is omitted.

As shown in FIG. 14, a coolant guide mechanism 17 includes an annular upper header 18 mounted on an outlet 14b of an electromagnetic pump 14, and an annular lower header 20 disposed below the upper header 18 and is mounted on an upper supporting plate 29. As shown in FIG. 14, the upper header 18 is provided with a plurality of nozzles 19 in a circumferential direction thereof. Each of the nozzles 19 projects downward and passes therethrough a pressurized primary coolant 21 from the electromagnetic pump 14. As shown in FIG. 14, the lower header 20 is formed of a plurality of nozzle receivers 27 slidably engaged with the nozzles 19 of the upper header 18. An annular seal 19a is interposed between the nozzles 19 and the nozzle receivers 27.

As shown in FIG. 14, each of the nozzle receivers 27 includes a receiving part 27b slidably engaged with the nozzle 19 of the upper header 18, and a tapered receiving base 27a configured to guide the corresponding nozzle 19 of the upper header 18 to the receiving part 27b. As shown in FIG. 14, the nozzle receiver 27 is fixed on the upper supporting plate 29 by means of a clamp 27c. In addition, as shown in FIG. 14, a sealing member 51 is interposed between the nozzle receiver 27 and the upper supporting plate 29. With the use of this structure, the structure of the lower header 20 can be more simplified, whereby reduction in cost can be achieved.

In this embodiment, the lower header 20 formed of the nozzle receivers 27 is fixed on the upper supporting plate 29, which is by way of example. However, not limited thereto, the lower header 20 formed of the nozzle receivers 27 may be fixed on a core support 13. Namely, in the embodiments (aforementioned third and sixth to eighth embodiments) in which the coolant guide mechanism 17 is connected to the core support 13, the lower header 20 formed of the nozzle receivers 27 may be used.

The invention claimed is:

1. A fast reactor comprising:
a reactor vessel;
a core and a coolant disposed in the reactor vessel;
a bulkhead disposed in the reactor vessel, the bulkhead surrounding the core from a lateral side;
an intermediate heat exchanger disposed between an inner surface of the reactor vessel and the bulkhead, the intermediate heat exchanger being configured to cool the coolant that has been heated by the core;
a pump for coolant disposed between the inner surface of the reactor vessel and the bulkhead, the pump for coolant being configured to pressurize the coolant that has passed through the intermediate heat exchanger so as to be cooled;
a neutron shield disposed below the pump for coolant;
a core supporting mechanism comprising an upper supporting plate which is disposed in the reactor vessel between the pump for coolant and the neutron shield, the upper supporting plate being mounted to the bulkhead and being provided with an opening through which the pressurized coolant from the pump passes;
a lower plenum structured below the core supporting mechanism, the lower plenum being configured to guide the coolant that has been pressurized by the pump for coolant to the core; and
a coolant guide mechanism disposed between an outlet of the pump for coolant and the upper supporting plate, the coolant guide mechanism being configured to guide the pressurized coolant from the pump for coolant to the lower plenum through the opening of the upper supporting plate,
wherein:
the coolant guide mechanism is connected to the opening of the upper supporting plate;
the coolant guide mechanism includes an annular upper header mounted on the outlet of the pump for coolant, and an annular lower header disposed below the upper header and mounted on the upper supporting plate;
the upper header is provided, in a circumferential direction thereof, with a plurality of downwardly projecting nozzles through which the pressurized coolant from the pump for coolant passes; and
the lower header is provided with a nozzle receiver that is slidably engaged with the nozzles of the upper header.

2. The fast reactor according to claim 1, wherein the nozzles are connected to the upper header through spherical seating seals.

3. The fast reactor according to claim 1, wherein at least one of the nozzles is longer than at least another one of the nozzles.

4. The fast reactor according to claim 1, wherein the core supporting mechanism further comprises a core support supporting the core from below and having an opening through which the pressurized coolant from the pump for coolant passes.

5. The fast reactor according to claim 4, wherein the nozzles are connected to the upper header through spherical seating seals.

6. The fast reactor according to claim 4, wherein at least one of the nozzles is longer than the at least another one of the nozzles.

7. The fast reactor according to claim 1, wherein when seen from above, the pump for coolant is arranged at a position nearer to the core than the intermediate heat exchanger, such that the pump for coolant and the intermediate heat exchanger do not overlap with each other.

8. The fast reactor according to claim 1, wherein a part of the bulkhead, which is located above the upper supporting plate, is formed of a manometerseal.

* * * * *